United States Patent
Sims-Barnes

(10) Patent No.: US 6,921,265 B2
(45) Date of Patent: Jul. 26, 2005

(54) LITERACY TRAINING METHOD

(76) Inventor: Wanda L. Sims-Barnes, 78 Edgebrook Estates Apt 12, Cheektowaga, NY (US) 14227

(*) Notice: Subject to any disclaimer, the term of this patent is extended or adjusted under 35 U.S.C. 154(b) by 308 days.

(21) Appl. No.: 09/921,801

(22) Filed: Aug. 6, 2001

(65) Prior Publication Data

US 2003/0027114 A1 Feb. 6, 2003

(51) Int. Cl.[7] ............................................. G09B 17/00
(52) U.S. Cl. ..................................................... 434/178
(58) Field of Search ............................... 434/156, 157, 434/159, 162, 167, 178, 180, 181, 182, 183, 184; 283/45, 46

(56) References Cited

U.S. PATENT DOCUMENTS

| | | | | |
|---|---|---|---|---|
| 2,524,143 A | * | 10/1950 | Smith | 434/317 |
| 3,611,593 A | * | 10/1971 | Shapiro | 434/178 |
| 3,774,318 A | * | 11/1973 | Sterriti | 434/184 |
| 4,045,884 A | * | 9/1977 | Zand | 434/184 |
| 4,379,699 A | * | 4/1983 | Nelson | 434/184 |
| 5,057,020 A | * | 10/1991 | Cytanovich | 434/178 |
| 5,336,093 A | * | 8/1994 | Cox | 434/178 |
| 5,584,698 A | * | 12/1996 | Rowland | 434/184 |

FOREIGN PATENT DOCUMENTS

| | | | | |
|---|---|---|---|---|
| EP | 0817153 A1 | * | 1/1998 | G09B/5/06 |
| EP | 817153 | * | 1/1998 | G09B/5/06 |

* cited by examiner

Primary Examiner—Kurt Fernstrom

(57) ABSTRACT

A method for teaching reading is disclosed wherein written text is segmented into situational defined elements, each segmented element of text is sequentially numerically registered, the numerically registered text is provided to a plurality of students, and words and phrases are identified by referencing the student to corresponding numerical designations in accord with the student's ability.

18 Claims, 3 Drawing Sheets

Disappointed[1] Zachary[2] usually[3] says[4], "I[5] wish[6] my[7] dog[8] could[9] still[10] do[11] some[12] of[13] the[14] things[15] that[16] normal[17] dogs[18] can[19] do[20]. Kayla[21] doesn't[22] remember[23] any[24] of[25] the[26] tricks[27] that[28] I[29] had[30] once[31] taught[32] her[33], a[34] long[35] time[36] ago[37]. I[38] certainly[39] can't[40] teach[41] her[42] new[43] tricks[44], because[45] she[46] is[47] too[48] old[49], and[50] therefore[51] seldom[52] listens[53] to[54] me[55] when[56] I[57] ask[58] her[59] about[60] doing[61] something[62]."

Steven[63] even[64] remembers[65] how[66] Zachary[67] often[68] shuffles[69] his[70] shoes[71] then[72] says[73], "many[74] times[75] Kayla[76] doesn't[77] even[78] listen[79] to[80] my[81] dad[82] or[83] mom[84]." But[85] with[86] an[87] especially[88] gentle[89] voice[90] and[91] the[92] warmest[93] smile[94], his[95] mom[96] and[97] dad[98] will[99] say[100], "You[101] must[102] understand[103] that[104] dogs[105] change[106] their[107] habits[108] when[109] they[110] become[111] old[112]." So[113] Zachary[114] muttered[115], "whenever[116] Kayla[117] disappears[118] from[119] our[120] home[121], we[122] all[123] have[124] that[125] big[126] responsibility[127] of[128] searching[129] the[130] neighborhood[131] to[132] find[133] her[134]."

Disappointed[1] Zachary[2] usually[3] says[4], "I[5] wish[6] my[7] dog[8] could[9] still[10] do[11] some[12] of[13] the[14] things[15] that[16] normal[17] dogs[18] can[19] do[20]. Kayla[21] doesn't[22] remember[23] any[24] of[25] the[26] tricks[27] that[28] I[29] had[30] once[31] taught[32] her[33], a[34] long[35] time[36] ago[37]. I[38] certainly[39] can't[40] teach[41] her[42] new[43] tricks[44], because[45] she[46] is[47] too[48] old[49], and[50] therefore[51] seldom[52] listens[53] to[54] me[55] when[56] I[57] ask[58] her[59] about[60] doing[61] something[62]."

Steven[63] even[64] remembers[65] how[66] Zachary[67] often[68] shuffles[69] his[70] shoes[71] then[72] says[73], "many[74] times[75] Kayla[76] doesn't[77] even[78] listen[79] to[80] my[81] dad[82] or[83] mom[84]." But[85] with[86] an[87] especially[88] gentle[89] voice[90] and[91] the[92] warmest[93] smile[94], his[95] mom[96] and[97] dad[98] will[99] say[100], "You[101] must[102] understand[103] that[104] dogs[105] change[106] their[107] habits[108] when[109] they[110] become[111] old[112]." So[113] Zachary[114] muttered[115], "whenever[116] Kayla[117] disappears[118] from[119] our[120] home[121], we[122] all[123] have[124] that[125] big[126] responsibility[127] of[128] searching[129] the[130] neighborhood[131] to[132] find[133] her[134]."

Fig. 1

Disappointed[1] Zachary[2] usually[3] says, "I wish[6] my dog[8] could[9] still[10] do some[12] of the things[15] that[16] normal[17] dogs can do. Kayla doesn't[22] remember[23] any[24] of the tricks[27] that[28] I had once[31] taught[32] her, a[34] long[35] time[36] ago[37]. I certainly[39] can't[40] teach[41] her new[43] tricks[44], because[45] she is too old[49], and therefore[51] seldom[52] listens[53] to me when[56] I ask[58] her about[60] doing[61] something[62]."

Steven[63] even[64] remembers[65] how Zachary[67] often[68] shuffles[69] his shoes[71] then[72] says, "many[74] times[75] Kayla doesn't[77] even[78] listen[79] to my[81] dad or mom." But[85] with[86] an especially[88] gentle[89] voice[90] and the warmest[93] smile[94], his mom and dad will[99] say, "You[101] must[102] understand[103] that[104] dogs change[106] their[107] habits[108] when[109] they[110] become[111] old[112]." So[113] Zachary[114] muttered[115], "whenever[116] Kayla disappears[118] from[119] our[120] home[121], we[122] all[123] have[124] that[125] big responsibility[127] of[128] searching[129] the neighborhood[131] to find[133] her."

Fig. 2

Disappointed[1] Zachary usually[3] says, "I wish my dog could[9] still do some of the things[15] that normal[17] dogs can do. Kayla doesn't remember[23] any of the tricks[27] that I had once taught[32] her, a long time ago. I certainly[39] can't teach[41] her new tricks[44], because she is too old, and[50] therefore[51] seldom[52] listens to me when I ask her about doing something[62]."

Steven[63] even remembers[65] how Zachary often shuffles[69] his shoes[71] then says, "many times Kayla doesn't even listen[79] to my dad or mom." But with an especially[88] gentle[89] voice and the warmest[93] smile[94], his mom and dad will say, "You must understand[103] that dogs change[106] their habits[108] when they become old." So Zachary muttered[115], "whenever Kayla disappears[118] from our home, we all have that big responsibility[127] of searching[129] the neighborhood[131] to find her."

Fig. 3

LITERACY TRAINING METHOD

This invention relates to a method for teaching reading to learning disabled students of varying capabilities in a group environment in accord with provisions of the federally mandated Technology-Related Assistance Act of 1988 and the Disabilities Act of 1990. The method provides numerical correlation with text in a manner which enables rapid communication among the teacher and each individual student for convenient control of individual student focus and understanding, particularly to accommodate the teaching of reading to learning disabled students. The method has particular utility in classroom reading instruction and enables a teacher to continually re-focus individual students to conceptual understanding of the vocabulary and specific textual content during a reading lesson. The method has utility in adult literacy programs, life skills and vocational education programs, teaching foreign languages, and teaching people with limited English skills.

BACKGROUND OF THE INVENTION

The ability to process and retrieve information varies widely among students for many reasons. Many explanations concerning the discourse in literacy learning are associated with neurological and/or cultural deficits. Variations in the speed and capability, particularly of students learning to read, has been a problem in modern society which relies upon the teaching professional to teach several students of diverse abilities in a classroom atmosphere. Learning to read requires multiple skills, particularly the visual association of text with meaning, the association of meaning with sound, and the connection of content with literal and inferential understandings and application.

A common method of teaching reading in group environments is for the teacher to model read or have individual students read aloud selected passages of text, with other students following the written text, the teacher correcting the student's pronunciation of text during recitation and contributing restatements of literal and inferential meaning of the textual matter being read. Each student in the class gets the benefit of each other student's recitation and confirmation of the correct pronunciation from the teacher as well as contextual literal and inferential meanings of the words being viewed and spoken.

It is not unusual that a group classroom comprises learning disabled with reading deficits, low-achieving and non-disabled students, that during the course of such students following text being recited by another that individual students become confused from visually identifying a word or group of words in text while they are being recited, or lost because of comments made by the teacher regarding meaning of the text. In a typical classroom with young students, the focus of an individual student can be easily disrupted by external events or a failure to rapidly identify a word or phrase, or even unfamiliarity with a word or phrase, leaving the student confused as to where in the text the recitation has progressed at any given time during the recitation. In classrooms with learning disabled students, focus of an individual student is often subject to neurological problems which even further exacerbates the problem of individual students learning to read and presents even greater problems for a single teacher trying to teach two or more students in a session.

When individual students become confused as to what words or text are being recited, they are generally reluctant to alert the teacher and soon the student becomes hopelessly lost. Teachers generally control such problem by their skilled observation of students during the process, and their ability to intuitively recognize when a student has become confused. Usually the teacher interrupts the recitation or mingles among the students pointing to the place in the text where the recitation has progressed, to give the individual student a bearing. Intuitive recognition skills of teachers vary and interruption usually involves significant explanation on the part of the teacher to get all of the group of students back to the same spot, thus the process is only as good as the individual teacher and considerably slows the rate of teaching and minimizes the amount of time spent on reading.

Variability in literacy learning has been an ongoing concern. The teaching professional is left with the dichotomy of either slowing down the teaching process to accommodate the learning disabled or struggling non-disabled student to the disadvantage of the more skilled, or maintaining a fast pace of teaching wherein the less able fall behind. These variations in ability were responsible for the past underlying assumption that different textbooks for low, middle and high reading group instruction would be beneficial for literacy development of all students. Equally discouraging is the continuation of children's low achievement from the delivery of reading instruction.

Attempts have been made to form classes into more closely equivalent learning groups, but such equivalency is difficult to assess and can still work to the disadvantage of those who fall marginally within its boundaries.

Of particular concern are those struggling students who may have learning disabilities which require constant refocusing by the student to overcome. Even in an ideally equivalent grouping, such students tend to need more personal supervision and input from the teaching professional. Such needs are time consuming and undercut the economics and efficiencies of classroom teaching. School systems have sought to resolve the problem by augmenting their classroom staff with remedial reading and special education professionals who interact with individual students in separate sessions, in addition to and/or together with group classroom work. Such augmentation is expensive and can deny the struggling reader the full benefit of the classroom experience enjoyed by their classmates. To segregate children by ability stigmatizes and creates detrimental emotional problems which block motivation and becomes more harmful for academic growth.

It is an object of the present invention to provide an improved method for the teaching of reading skills which has application through a broad spectrum of students.

It is another object of the invention to provide a method for teaching reading which enables quick re-orientation of a student during textual reading lessons.

It is a further object of the invention to provide a method for enabling the teacher to quickly and effectively focus the student to a precise reading point.

These and other objects of the invention will be apparent from the following description of the invention.

SUMMARY OF THE INVENTION

In its most general embodiment, the present invention comprises a process for teaching individuals of disparate reading capability within a group environment how to read, the method broadly incorporating the correlation of textual material to a sequential numbering system, to enable registered reference for individual focus.

It is known, that students of all ages and learning disabilities, can be taught to count, recognize the sequential order of numerals and retain such recognition much easier than they can be taught the association of textual language, meaning, sounds and understanding of the written language. Children, beginning from age about 3 can be generally taught numerical counting and visual recognition of sequential order of numbers from 1 to 10, and by the time they are 5–6 years old have a significant mastery and recognition of the progressive numerical sequence of numbers to about 100 or above. Even low achieving students and those having moderate to severe learning disabilities, are generally familiar with number recognition and retain recognition of the sequential progression of numbers. Thus, most non-reading students beyond the age of about 4, when told or shown a specific number, can find that number in a written document containing a plurality of sequentially presented numbers.

The present invention takes advantage of the ease in which non-reading students can identify specific numbers to augment teaching of reading by a teacher among a group of differently capable struggling readers and/or elementary reading students.

The method of the invention generally comprises segmenting written text into situational defined elements, such as words, phrases, sentences, lines and the like, each segmented element of text being sequentially numerically registered, the defined elements being determined based upon the range of capabilities within the group of students being taught reading. The numerically segmented text is then provided to the student and in the course of common oral recitation, the teacher identifies words and phrases by referencing the student to corresponding numerical designations in accord with their ability.

In one embodiment of the invention, a textual document provided for reading by a group of students evaluated as primarily containing first time readers who have little if any textual word recognition or have severe reading dysfunctionality, comprises a sequential numerical registration of each word of the text. In another embodiment, a group evaluated as comprising elementary readers having select word recognition or moderate reading dysfunctionality, may use a textual document comprising a sequential numerical registration of phrases in the text or merely select words of the text.

In a preferred embodiment of the invention, particularly suitable for use with fourth through sixth grade students who have moderate to severe reading dysfunction, a textual document is arranged such that each line of text is presented in clear block letters within a distinct rectangular box marked outline and each word within a rectangular box outline is consecutively superscript numbered at the top right thereof. Numbering in each following rectangular boxed line of text is consecutive with the former rectangular boxed line of text, such that each word, in for example a single page document containing 50 words, will have a distinct superscript number from 1–50. In a particularly preferred embodiment, the block letter text is in bold print, the superscript numbering is shaded lighter than the text and the rectangular outline is in a significantly subdued shade. In an even further preferred embodiment, the paper upon which the document is printed is an off-white color such as cream or ivory, each word of text and each line of text being separated from each other by exaggerated spacing.

In one method of the invention, the teacher directs the students to count down an appropriate number of blocks or lines of text to a particular numbered word, or merely identify the numbered word in the document for reference by the student. The teacher may read the text aloud, with reference to a numbered word which is being recited as may be desired, or may reference a numbered word or block for a student to recite. In a particularly preferred embodiment, students are seated at independent reading stations with each student being in independent communication with an audio device which provides a recorded recitation of the text of the document with instructions being referenced to the student in numbered sequences.

BRIEF DESCRIPTION OF THE DRAWINGS

FIG. 1 illustrates a textual document numerically referenced for 8–10 year old students who have severe reading deficit or dysfunction.

FIG. 2 illustrates the textual document of FIG. 1 numerically referenced for 8–10 year old students who have moderate reading deficit or dysfunction.

FIG. 3 illustrates the textual document of FIG. 1 numerically referenced for 8–10 year old students who have mild reading deficit or dysfunction.

DESCRIPTION OF THE PREFERRED EMBODIMENT

Referring now to the drawings, therein FIGS. 1–3 illustrate the same page of a textual document in different numerically referenced embodiments to show the manner of use of the method of the invention within a group of disparate capability students.

In FIG. 1, all words in the text comprise a superscript numerical reference number and all lines are rectangularly blocked, the document being specifically referenced for 8–10 year old students who have severe reading deficit or dysfunction. In the method of the invention, each severe deficit or dysfunctional student is provided with the document and the teacher recites or directs a student to recite or read along a line of textual material contained in a first box outline, by either identifying a superscript number contained at the top right of the first word in the box outline or by having the student count down or up to the box outline. As the teacher observes the behavior of the various students in either an oral reader's pronunciation of words or confusion of a reader following the text, the teacher may correct pronunciation or direct the class or a particular student to a particular word by reference to both its sound and its numerical designation. As the teacher desires to reinforce the pronunciation, meaning, tense or otherwise characterize a word or phrase the teacher can do same by reference to the numerical designation of the particular word or words comprising the phrase.

In FIG. 2, the text is exactly the same as FIG. 1 and all lines are rectangularly blocked exactly the same, but a reduced number of words in the text comprise superscript numerically referenced numbers, the document being specifically referenced for 8–10 year old students who have slightly less (e.g. moderate) reading deficit or dysfunction than those using the text of FIG. 1. In FIG. 2, select words are numerically sequentially referenced, but the selection is limited to the first word in a rectangular block and various select words in the text which are most likely to confuse a student of moderate capability. It is pointed out that the words that are numbered in FIG. 2, comprise the same number as that same word appearing in that same position in FIG. 1.

This registered arrangement is particularly useful in a mixed class wherein there are both severe and moderate reading deficient or dysfunctional students. Thus, severely dysfunctional students would have the text of FIG. 1 before them and moderate dysfunctional students the text of FIG. 2 before them. Corrections and explanations based upon registered reference to words can be given to all students, with FIG. 1 students being specifically referenced to each specific word being discussed and FIG. 2 students being forced to independently derive specific reference to words falling between those words which are numerically designated in their text. Students in a class may progress from the arrangement of FIG. 1 to the arrangement of FIG. 2 in the same class as a mark of their progress, with the teacher still maintaining the teaching advantage of registered reference for all students in the class.

In FIG. 3, the text is the same as FIGS. 1–2, but no lines are rectangularly blocked, and a further reduced number of words in the text is superscript numerically referenced. This document is specifically referenced for 8–10 year old students who have mild deficiency or dysfunctional capabilities and the highest reading skills in the class. Thus, in a class containing severe, moderate and mild dysfunctional students, corrections and explanations based upon registered reference to words to the most severely dysfunctional students can be given by the teacher to all students, with FIG. 1 students being challenged to strictly follow the numerical sequence to find the specific word being referenced; FIG. 2 students being challenged to independently interpolate the abbreviated numerical sequence of their document and apply their greater knowledge of words to independently find a specific word which might not be numbered; and FIG. 3 students being even further challenged to independently interpolate between extremely abbreviated reference numbering to identify a word falling between those words numerically designated in their text.

As can be seen, differently numerically registered texts, can be effectively used in a single classroom containing a plurality of disparate dysfunctional readers, with the teacher giving a single notation reference that has meaning to all levels of ability, but equally challenges the recognition skills of those of higher ability level. Thus, the numerical reference to a single word in a classroom containing students at different levels of reading dysfunction, challenges a severely dysfunctional reader to find the number and word associated therewith within the sequence; challenges a moderate dysfunctional reader to derive the geographic location of a familiar word between closely spaced numerical references; and challenges a mildly dysfunctional reader to derive the geographic location of a familiar word between far spaced numerical references.

I claim:

1. A method for teaching a plurality of reading disabled students how to read in a group session comprising:

providing a plurality of documents, each document containing an equal number of distinct lines of text containing a plurality of words, each distinct line of text on each document containing the same words arranged in the same order as the corresponding distinct line of text on each other document, each document having select words identified by progressive numbering along said lines of text, said numbering beginning at a first selected word of a first line of text having a numbered word and continuing through a last selected word of a last line of text having a numbered word;

directing a first reading disabled student to read a selected line of text by referring to the number identifying a word contained in said selected line of text;

directing a second student to recite a line of text contained in another line of text by referring to the number of a numbered word contained in said another line of text;

from time to time interrupting a student reciting a line of text and referring to the plurality of students the number of a numbered word at about where the student was interrupted;

from time to time directing a student to pronounce a word referred to by number to the plurality of students;

from time to time explaining the meaning of a word referred to by number to the plurality of students.

2. The method of claim 1 wherein text in a document is presented in bold printed block letters.

3. The method of claim 1 wherein said select words are superscript numbered at the top right thereof.

4. The method of claim 3 wherein said superscript numbering is shaded lighter than said block letters.

5. The method of claim 1 wherein each line of text on a document is arranged within a distinct rectangular box outline.

6. The method of claim 5 wherein said distinct rectangular box outline is shaded lighter than the progressive numbering.

7. The method of claim 1 wherein the progressive number identifying a word in a document corresponds to the position of the word numerically from the start of the document.

8. The method of claim 7 wherein each word along each distinct line of text of a document is consecutively numbered.

9. The method of claim 8 wherein said plurality of documents comprises a first document wherein each word along each distinct line of text is consecutively numbered, and a second document wherein only select words along distinct lines of text are numbered, each select numbered word of said second document having the same number as the corresponding numbered word on a corresponding distinct line of text of said first document.

10. The method of claim 9 wherein said the first word of each distinct line of text comprising said second document is numbered each numbered first word of a distinct line of text of said second document having the same number as the corresponding numbered word on a corresponding distinct line of text of said first document.

11. The method of claim 1 wherein each document comprises a plurality of distinct lines of text containing a plurality of words arranged for sequential reading, said words being identified by sequential numbering arranged adjacent said words along said lines of text, said numbering beginning at a first selected word of a first line of text having a numbered word and continuing through a last selected word of a last line of text having a last sequentially numbered word, wherein each sequential number identities a registered position of a numbered word which is distinct from the registered position of each other sequentially numbered word in the document.

12. The method of claim 11 wherein said sequentially numbered words are superscript numbered at the top right thereof.

13. The method of claim 12 wherein said superscript numbering is shaded lighter than the letters comprising said words.

14. The method of claim 11 wherein each line of text is arranged within a distinct rectangular box outline.

15. The method of claim 11 wherein said rectangular box outline is shaded lighter than the letters comprising said words.

16. The method of claim 11 wherein the sequential number identifying a sequentially numbered word corresponds to the position of the word numerically from the start of the document.

17. A method for teaching reading comprising segmenting written text into situational defined elements, each segmented element of text being sequentially numerically registered; providing said segmented text to a student; identifying words and phrases by referencing the student to corresponding numerical designations in accord with the student's reading ability.

18. A method for teaching a plurality of reading disabled students how to read in a common session comprising:

providing a student with a document containing a plurality of lines of text, each line of text being arranged within a distinct rectangular box outline and each word contained along a line being consecutively superscript numbered adjacent thereto;

directing a first student to recite a line of text contained in a first box outline, by identifying a superscript number contained adjacent the first word in said first box outline;

directing a second student to recite a line of text contained in a second box outline, by identifying a superscript number contained adjacent the first word in said second box outline;

from time to time interrupting a student reciting a line of text and identifying to the plurality of students the superscript number adjacent the word at which the student was interrupted;

from time to time directing a different student to pronounce the word identified by interruption, to the plurality of students;

from time to time explaining the meaning of a word identified by interruption, to the plurality of students.

\* \* \* \* \*